United States Patent Office 2,937,138
Patented May 17, 1960

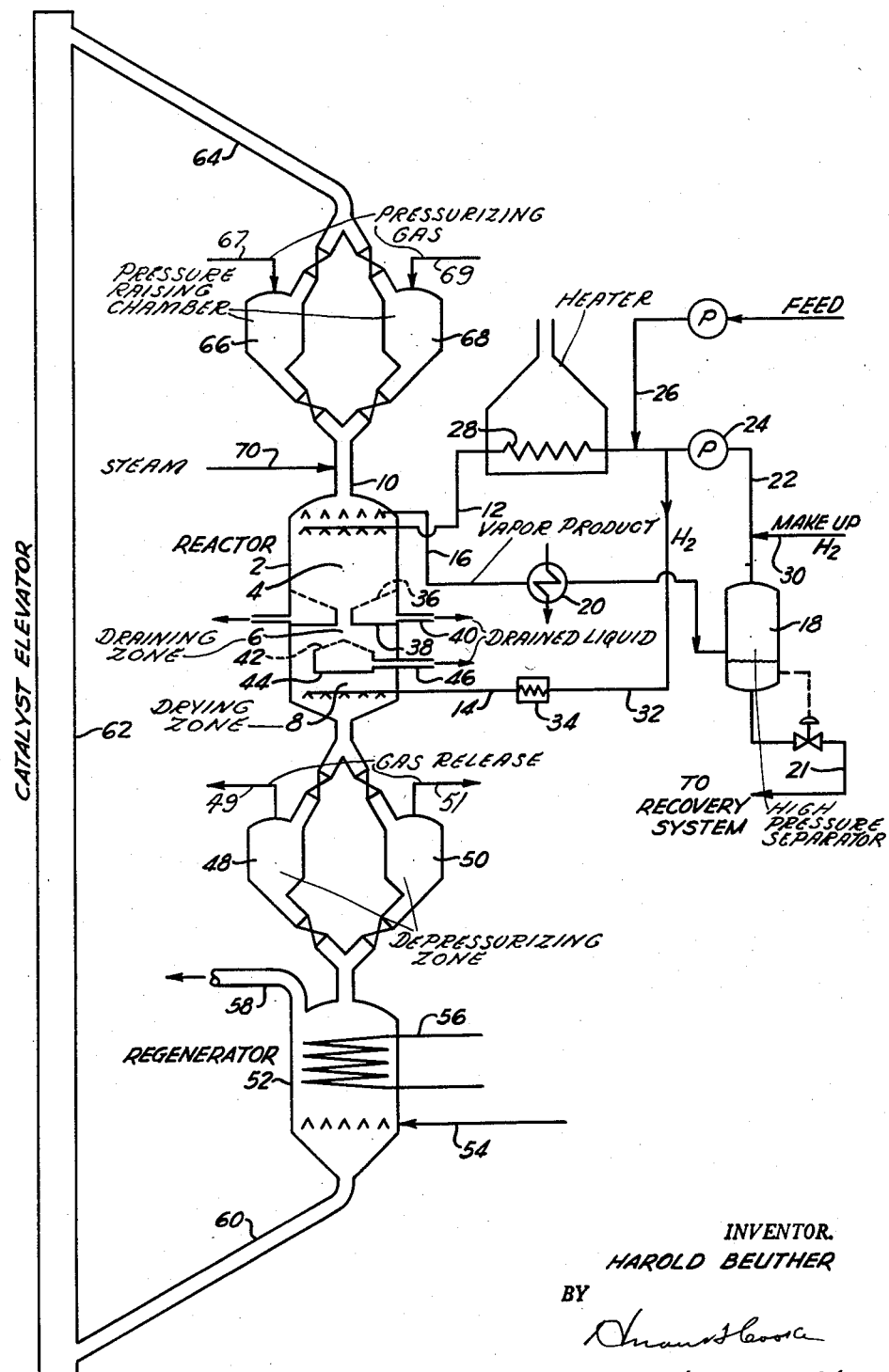

2,937,138
APPARATUS AND PROCESS FOR HYDROFINING HYDROCARBONS

Harold Beuther, Penn Township, Allegheny County, Pa., assignor to Gulf Research & Development Company, Pittsburgh, Pa., a corporation of Delaware Application December 4, 1956, Serial No. 626,144

4 Claims. (Cl. 208—213)

This invention relates to improved procedure and apparatus for treatment of high boiling hydrocarbons and in particular to process and apparatus for treating a high boiling hydrocarbon which contains sulfur compounds and a substantial amount of asphaltic material.

It is of course well known to treat hydrocarbons containing sulfur compounds with hydrogen in the presence of a hydrogenation catalyst in order to remove the sulfur compounds. Because of the cost of high pressure equipment, it is advantageous when treating crude petroleum to first distill to obtain a heavy fraction of the crude containing sulfur compounds and then desulfurize this heavy fraction. This reduces the volume of material which must be treated and therefore reduces the cost of processing and cost of apparatus used. In order to further reduce the cost of the equipment, it is desirable to treat under moderate pressure conditions of about 100 to 2000 p.s.i. However, the treatment of a high boiling hydrocarbon such as a low quality crude containing large amounts of asphaltic materials or a heavy fraction such as the vacuum bottoms fraction of a crude under moderate pressure conditions constitutes a real problem. The asphaltic content of course is high and the moderate pressure conditions make it difficult to convert these asphaltic materials into useful hydrocarbons.

This invention has for its object to provide an improved process for treating a high boiling hydrocarbon which contains sulfur compounds and a substantial amount of residual or asphaltic material under moderate pressure conditions. Another object is to provide improved procedure for removing sulfur-containing compounds from a vacuum tower bottoms fraction of a crude utilizing moderate pressure conditions. Another object is to provide improved apparatus for treating high boiling hydrocarbons containing sulfur and asphaltic compounds under moderate pressure conditions. Other objects will appear hereinafter.

These and other objects of my invention are accomplished by treating the high boiling hydrocarbon which contains sulfur compounds and substantial amounts of residual or asphaltic materials and which has an API gravity of below about 20, under moderate pressure conditions of about 100 to 2000 p.s.i. This treatment is accomplished by continuously introducing the high boiling hydrocarbon which is to a substantial extent in the liquid phase and a granular hydrogenation catalyst into the upper portion of a high pressure reactor. The catalyst particles are maintained in the reactor in the form of a compact body which travels downwardly through the reactor with the high boiling hydrocarbon charge. The reactor is maintained under mild conversion conditions which will result in not more than about an API gravity increase of 25, said conditions comprising the pressure specified, a temperature between about 750° and 850° F., a space velocity between about 0.3 and 2.0 and a catalyst to oil ratio between about 0.1:1 and 5:1. Hydrogen is introduced into the lower portion of the reactor whereby the hydrogen flows upwardly countercurrently to the downwardly flowing column of catalyst granules and the high boiling hydrocarbon liquid. The hydrogen and hydrocarbon vapors are removed from the upper part of the reactor. The unconverted hydrocarbon liquid on the catalyst granules in the lower portion of the reactor is drained from the catalyst granules and removed from the reactor. The drained catalyst granules are then contacted with the fresh current of hydrogen prior to its initial contact with the catalyst granules and high boiling hydrocarbon in the first part of the reactor so that at least a portion of any residual unconverted hydrocarbon remaining on the catalyst granules is removed and the catalyst granules are further dried. At least part of the dried catalyst granules are regenerated by combustion to remove the coke-like deposit on the catalyst granules, and the regenerated catalyst granules are returned to the upper part of the high pressure reactor for re-use in the process.

My invention also includes apparatus for hydrogen treatment of a high boiling hydrocarbon which contains sulphur compounds and a substantial amount of asphaltic material. This apparatus comprises a pressure reactor forming an upper reaction zone, a lower drying zone and a drainage zone positioned intermediate the reaction and drying zones. Means are provided for continuously introducing granular catalyst and high boiling charge stock into the upper part of the reaction zone. Means are also provided for draining liquid from catalyst granules which means is positioned concentrically within the reactor walls and in said draining zone. This draining means is also positioned a substantial distance below the point of introduction of catalyst and charge stock into the reactor. Associated with the drainage means is means for collecting drained liquid. Means is provided for introducing gas into the drying zone and into intimate contact with catalyst granules present therein during operation. Also means is positioned in the lower portion of the drying zone for removing granular catalyst from said lower portion of the drying zone. The apparatus includes regenerating means for removing granular catalyst and means for introducing regenerated catalyst granules into the upper part of the pressure reactor. My apparatus also includes means for removing gas and vaporous products from the upper part of the reactor.

In the following examples and description I have set forth several of the preferred embodiments of my invention, but it is to be understood that they are given by way of illustration and not in limitation thereof.

The charge stock utilized in my improved process may be any high boiling hydrocarbon having an API gravity below about 20 containing sulfur compounds and a substantial amount of residual or asphaltic materials. Such charge stocks ordinarily will be obtained as low value fractions from refinery operations in which crudes are treated to separate the more valuable portions of the crudes. It is preferred to utilize a vacuum bottoms fraction of a crude in which the gas oil, gasoline, lubricating oil portions, etc. have been removed. Such vacuum bottoms fractions constitute low value portions of the crude and their treatment to obtain products of higher value are a real need as well as a real problem. While I prefer to utilize vacuum bottoms as a charge stock, my invention is equally applicable to any whole crude or fraction thereof which has an API gravity below about 20. Thus there are many low quality crudes which have a low API gravity in the range mentioned which can be advantageously treated in accordance with my invention without preliminary separation of any of the components thereof. However, in order to obtain the maximum advantages of my invention I prefer to subject a crude to distillation to obtain a vacuum tower bottoms fraction constituting about 50 percent or less of the original crude. Examples of suitable charge stocks are 50 percent vacuum tower bottoms fractions of Kuwait and West Texas crudes and Baxterville whole crude.

As indicated my invention involves the utilization of mild conversion conditions. The objective is to obtain as much desulfurization as possible under the mild conditions utilized with minimum conversion of the asphaltic materials in the charge stock. It is, of course, quite possible to utilize severe conditions and obtain a high degree of conversion of the hydrocarbon and asphaltic materials into large amounts of gasoline and other lower boiling hydrocarbons. However, in carrying out severe conversion, large amounts of asphaltic materials and high boiling hydrocarbons are converted into coke which is deposited upon the catalyst and the regeneration requirement is thus greatly increased. It is not economical to operate in this manner with these high boiling charge stocks, and I have found that it is advantageous to utilize mild conversion conditions which result in an API gravity increase of not more than about 25. Temperatures of between about 750° and 850° F. and a space velocity between about 0.3 and 2.0 and a catalyst to oil ratio between about 0.1:1 and 5:1 will be utilized to obtain these mild conversions. The specific conditions utilized will depend to a considerable extent on the charge stock employed and especially its sulfur and asphaltic content. However, the mild conversion conditions will fall within the ranges specified. As indicated any conditions which result in less than about 25 API gravity increase may be utilized in my invention.

Any hydrogenation catalyst may be used. Many hydrogenation catalysts are adversely affected by sulfur compounds so that they will have a relatively short life in my process. Therefore I prefer to employ sulfur resistant hydrogenation catalysts. The catalyst is deposited upon a porous carrier such as activated alumina, bauxite, activated alumina containing a small amount of silica, silica-alumina cracking catalysts, etc. Examples of suitable hydrogenation catalysts are iron group metals, i.e. cobalt, nickel and iron, tungsten oxide, molybdenum oxide and vanadium oxide. I prefer to utilize compounds or mixtures of the oxides of the iron group metals and the oxides of group VI, left-hand column metals, of the periodic table. Examples of such catalysts are cobalt oxide-molybdenum oxide and nickel oxide-tungsten oxide. The catalysts are composited with the carrier to form granules or pellets of the size conventionally used in a moving bed type of process.

In the accompanying drawing I have shown diagrammatically my improved apparatus which also illustrates the manner in which my improved process may be carried out. Referring to the drawing, numeral 2 designates a reactor provided with reaction zone 4, draining zone 6 and drying zone 8. Catalyst pellets or granules heated to about reaction temperature are introduced into the top of the reactor via conduit 10. These catalyst granules are evenly distributed in the upper portion of the reactor and flow downwardly as a compact bed through reaction zone 4. A preheated high boiling charge stock is introduced into the upper part of the reactor through conduit 12. Preheated hydrogen is introduced into the lower portion of the drying zone 8 through conduit 14. The hydrogen flows upwardly through the drying, draining and reaction zones and contacts the downwardly flowing catalyst pellets and hydrocarbon charge stock. Hydrogenation of sulfur compounds to form hydrogen sulfide and some lower boiling hydrocarbon takes place. The vapor reaction products and hydrogen are removed through conduit 16 and are delivered to high pressure separator 18 after cooling in condenser 20. Liquid reaction products from high pressure separator 18 are removed through conduit 21 and separated in a suitable recovery system (not shown). Hydrogen separated in high pressure separator 18 is removed through conduit 22 and is partly returned to reactor 2 by compressor 24 together with feed stock from conduit 26 after heating in coil 28. Make-up hydrogen may be added through conduit 30. The balance of the hydrogen from compressor 24 is circulated via conduit 32, heater 34 and conduit 14 into the lower portion of drying zone 8 in reactor 2.

As the catalyst granules flow downwardly through reaction zone 4 they come into contact with truncated perforated cone 36. The perforations in cone 36 are of such size that liquid may freely pass therethrough without substantial passage of catalyst pellets or granules. The liquid draining through the perforations is caught on a collecting device or pan 38 and is removed through conduits 40. The partially drained catalyst pellets then flow through the central opening or truncated portion of the conical member 36 onto an inverted conical perforated member 42 positioned concentrically within the reactor and concentrically with the opening in inverted cone 36. The catalyst pellets are further drained on the surface of inverted cone 42 in the same manner and the drained liquid collects on collecting device or pan 44 and is removed through conduit 46.

The drained catalyst particles then flow into drying zone 8 where they are contacted with heated hydrogen introduced through conduit 14. Since the hydrogen is at elevated temperature and since the catalyst particles are also at approximately reaction temperature, conversion of the residual hydrocarbons thereon into vapors takes place to a substantial extent so that the hydrocarbons are removed therefrom and need not be burned in the subsequent regeneration, thus reducing the regeneration requirement. At the same time due to the mild conversion conditions utilized in the reactor asphaltic materials are not converted into coke to a substantial extent and remain as liquids under the conversion conditions so that the asphaltic materials are to a large extent removed during the draining operation. The dried catalyst particles then flow into depressuring vessel 48 or alternatively depressuring vessel 50 where the pressure is reduced as a result of gas released through conduits 49 and 51 respectively. These depressuring vessels are used alternately in known manner to remove solid particles from the high pressure reactor system. The depressured catalyst particles then flow into regenerator 52 where they are regenerated by combustion, oxygen-containing gas, such as air, being introduced through conduit 54 to burn off carbon or coke deposits. Heat recovery may be advantageous by means of heat exchanger tubes 56. Combustion gas is removed through conduit 58 and regenerated catalyst flows downwardly through conduit 60 into elevator 62 which may be a mechanical elevator or a gas lift. Elevated catalyst flows from the top of elevator 62 through conduit 64 and then into pressurizing chambers 66 to 68. Pressurizing chambers 66 and 68 are operated alternately in known manner to bring solid particles up to reaction pressure by means of pressurizing gas introduced through conduits 67 and 69 respectively. The solid particles then flow from the pressurizing chamber through conduit 10. After contacting with steam introduced through conduit 70 the catalyst flows into reactor 2. Pressurizing and depressuring chambers need not be used if regeneration is carried out at about reaction pressure.

EXAMPLE

A Kuwait vacuum tower bottoms having the properties shown in Table I is introduced into a reactor similar to that illustrated in the drawing. A hydrogenation catalyst comprising 12 percent nickel and tungsten oxides deposited upon alumina stabilized with about 4 percent silica is passed through the reactor which is maintained under a pressure of 1000 p.s.i.g., and a temperature of about 800° F. Hydrogen is recycled through the reactor at the rate of 18,000 s.c.f./bbl. of charge. The charge was introduced at a space velocity of 0.68 liquid volume of charge stock per volume of catalyst per hour. The on-stream reaction was continued for a throughput of 2.70 volumes of charge per volume of catalyst. During the reaction an unconverted tar-like fraction is drained from the catalyst and is removed from the reactor and is discarded. The properties of this tar are shown in Table II. Vapor reaction products and hydrogen are removed overhead from the reactor and the liquid reaction products are separated from the hydrogen and other permanent gases. The hydrogen is recycled. The properties of the liquid reaction products are given in Table III.

*Table I*

| | |
|---|---|
| Gravity, °API | 5.5 |
| Sulfur, percent | 5.45 |
| Carbon residue, percent | 23.1 |
| Viscosity, SUV, sec., 210° F | 22,132 |

*Table II*

Yield of tar:

| | |
|---|---|
| Percent by wt. of charge | 32.9 |
| Percent by vol. of charge | 31.8 |

Inspection of tar:

| | |
|---|---|
| Gravity, °API | 0.9 |
| Viscosity, SUV, sec., 210° F | 3627 |
| Sulfur, percent | 4.83 |
| Carbon residue, Conradson, percent | 28.13 |

*Table III*

Yield of liquid:

| | |
|---|---|
| Percent by wt. of charge | 50.5 |
| Percent by vol. of charge | 60.6 |

Inspection of liquid:

| | |
|---|---|
| Gravity, °API | 33.0 |
| Sulfur, percent | 1.76 |

As a result of operating in this manner the sulfur-hydrocarbon molecule is converted into lower boiling hydrocarbons and hydrogen sulfide. The hydrocarbons initially in the charge stock are also converted into lower boiling hydrocarbons to a moderate extent. However, such conversion is minimized so that asphaltic material is not converted into coke to a substantial extent and may be removed as a liquid in the draining step. The drained liquid is advantageously subjected to distillation to recover higher boiling hydrocarbons having a lower sulfur content. Alternatively it may be subjected to a delayed coking or like operation or used as a low grade fuel.

I claim:

1. The process for treating a high boiling hydrocarbon which contains sulfur compounds and has an API gravity of below about 20 which comprises in combination continuously introducing the high boiling hydrocarbon while substantially in liquid phase and a granular hydrogenation catalyst into the upper portion of a high pressure reactor, maintaining the catalyst particles in the form of a compact body in the reactor, maintaining the reactor under mild conversion conditions resulting in not more than about an API gravity increase of 25, said conditions comprising a pressure of between about 100 and 2000 p.s.i., a temperature between about 750° and 850° F., a space velocity between about 0.3 and 2 and a catalyst to oil ratio between about 0.1:1 and 5:1, causing the high boiling hydrocarbon liquid and the catalyst granules to flow downwardly by gravity through the high pressure reactor, simultaneously introducing hydrogen into the lower portion of the reactor whereby the hydrogen flows upwardly countercurrently to the downwardly flowing column of catalyst granules and high boiling hydrocarbon liquid, removing hydrogen and hydrocarbon vapors from the upper part of the reactor, draining the unconverted liquid hydrocarbon from the catalyst granules in the lower portion of the reactor, withdrawing the drained and separated unconverted liquid from the high pressure reactor, contacting the drained catalyst granules with the fresh current of hydrogen prior to its initial contact with the catalyst granules and high boiling hydrocarbon whereby at least a portion of any residual unconverted hydrocarbon remaining on the catalyst granules is removed and the catalyst granules are further dried, subjecting at least part of the dried catalyst granules to regeneration by combustion to remove the coke-like deposit on the catalyst granules and returning the regenerated catalyst granules to the upper part of the high pressure reactor for re-use in the process.

2. The process for treating a high boiling hydrocarbon constituting a vacuum distillation bottoms fraction of a crude which contains sulfur compounds and has an API gravity of below about 20 which comprises in combination continuously introducing said high boiling hydrocarbon while substantially in liquid phase and a granular hydrogenation catalyst into the upper portion of a high pressure reactor, maintaining the catalyst particles in the form of a compact body in the reactor, maintaining the reactor under mild conversion conditions which result in not more than about an API gravity increase of 25, said conditions comprising a pressure of between about 100 and 2000 p.s.i., a temperature between about 750° and 850° F., a space velocity between about 0.3 and 2, and a catalyst to oil ratio between about 0.1:1, and 5:1, causing the high boiling hydrocarbon liquid and the catalyst granules to flow downwardly by gravity through the high pressure reactor, simultaneously introducing hydrogen into the lower portion of the reactor whereby the hydrogen flows upwardly countercurrently to the downwardly flowing column of catalyst granules and high boiling hydrocarbon liquid, removing hydrogen and hydrocarbon vapors from the upper part of the reactor, draining the unconverted liquid hydrocarbon from the catalyst granules in the lower portion of the reactor, withdrawing the drained and separated unconverted liquid from the high pressure reactor, contacting the drained catalyst granules with the fresh current of hydrogen prior to its initial contact with the catalyst granules and high boiling hydrocarbon whereby at least a portion of any residual uncoverted hydrocarbon remaining on the catalyst granules is removed and the catalyst granules are further dried, subjecting at least part of the dried catalyst granules to regeneration by combustion to remove the coke-like deposit on the catalyst granules and returning the regenerated catalyst granules to the upper part of the high pressure reactor for re-use in the process.

3. Apparatus for high pressure hydrogen treatment of a high boiling hydrocarbon which contains sulfur compounds and residual hydrocarbons which comprises in combination a high pressure reactor forming an upper reaction zone, a lower drying zone and a draining zone positioned intermediate the reaction and drying zones, said reactor being adapted during operation to form and maintain a compact body of catalyst granules in the reaction zone, means for continuously introducing granular catalyst into the upper part of the reaction zone, means for introducing high boiling hydrocarbon charge stock into the upper part of the reaction zone, means for draining liquid from the catalyst granules comprising a perforated surface, the perforations of which are sized to permit liquid to readily flow therethrough but to prevent substantial flow of catalyst granules therethrough, which draining means is positioned in said draining zone so that catalyst granules flow thereover and liquid on the granules drains by gravitational force through the perforations and positioned a substantial distance below the means for introducing catalyst and charge stock into the reactor, means for collecting drained liquid, said means for collecting drained liquid being positioned below the means for draining liquid so that drained liquid flows by gravity from the means for draining liquid into the means for collecting drained liquid means for removing drained and collected liquid from the reactor, means for introducing gas into the drying zone and into intimate contact with granular catalyst present therein during operation, means positioned in the lower portion of the drying zone for removing granular catalyst from the lower portion of the drying zone, means for regenerating at least part of the removed granular catalyst, means for introducing regenerated catalyst granules into the upper part of the high pressure reactor and means for removing gas and vaporous reaction products from the upper part of the reactor.

4. Apparatus for hydrogen treatment of a high boiling hydrocarbon which contains sulfur compounds and residual material which comprises in combination a high pressure reactor forming an upper reaction zone, a lower drying zone and a draining zone positioned intermediate the reaction and drying zone, means for continuously introducing granular catalyst into the upper part of the reaction zone, means for introducing high boiling hydrocarbon charge stock into the upper part of the reaction zone, means for draining liquid from the catalyst granules which means is positioned concentrically with the reactor walls in said draining zone and is positioned a substantial distance below the means for introducing catalyst and charge stock into the reactor, means for collecting drained liquid, said draining means comprising an upper perforated truncated conical member and a lower inverted perforated cone of smaller diameter the apex of which is positioned centrally with respect to the truncated portion of the upper truncated cone, means for collecting liquid which during operation drains through the perforations in each of said conical draining means, said collecting means comprising a pan positioned below each of the conical draining means, a conduit connected to each of said pans for removing liquid collected thereon, means for introducing gas into the drying zone and into intimate contact with granular catalyst present therein during operation, means positioned in the lower portion of the drying zone for removing granular catalyst from the lower portion of the drying zone, means for regenerating at least part of the removed granular catalyst granules, means for introducing regenerated catalyst granules into the upper part of the high pressure reactor and means for removing gas and vaporous reaction products from the upper part of the reactor.

References Cited in the file of this patent

UNITED STATES PATENTS

| | | |
|---|---|---|
| 2,574,850 | Utterback et al. | Nov. 13, 1951 |
| 2,702,267 | Keith | Feb. 15, 1955 |
| 2,741,582 | Evans et al. | Apr. 10, 1956 |
| 2,744,053 | Kay et al. | May 1, 1956 |
| 2,844,516 | Berg et al. | July 22, 1958 |